United States Patent
Oishi et al.

(10) Patent No.: US 8,740,198 B2
(45) Date of Patent: Jun. 3, 2014

(54) SPRING GUIDE AND CUSHION DEVICE

(75) Inventors: Akiko Oishi, Wako (JP); Kazuo Yamamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 468 days.

(21) Appl. No.: 13/028,141

(22) Filed: Feb. 15, 2011

(65) Prior Publication Data

US 2011/0204551 A1 Aug. 25, 2011

(30) Foreign Application Priority Data

Feb. 24, 2010 (JP) ................................. 2010-038765

(51) Int. Cl.
*F16F 1/06* (2006.01)

(52) U.S. Cl.
USPC ............................................ 267/169; 267/179

(58) Field of Classification Search
USPC ........... 267/221, 70, 169, 179, 178, 170, 174; 188/322.21, 321.11; 280/124.179
See application file for complete search history.

(56) References Cited

U.S. PATENT DOCUMENTS

| | | | | |
|---|---|---|---|---|
| 2,277,124 A | * | 3/1942 | Maliphant et al. | 92/130 R |
| 4,465,296 A | * | 8/1984 | Shiratori et al. | 280/124.155 |
| 4,923,182 A | * | 5/1990 | Resuggan | 267/169 |
| 5,788,262 A | * | 8/1998 | Dazy et al. | 280/124.155 |
| 6,149,171 A | * | 11/2000 | Bono et al. | 280/124.179 |
| 6,642,451 B1 | * | 11/2003 | Gretz | 174/653 |
| 6,869,067 B2 | * | 3/2005 | Duval et al. | 267/220 |
| 7,370,855 B2 | * | 5/2008 | Youd et al. | 267/179 |
| 2001/0038174 A1 | * | 11/2001 | Muller | 267/221 |
| 2006/0082037 A1 | * | 4/2006 | Al-Dahhan | 267/179 |
| 2006/0175167 A1 | * | 8/2006 | Horiba et al. | 188/322.19 |
| 2007/0194507 A1 | * | 8/2007 | Kato et al. | 267/179 |
| 2010/0021263 A1 | * | 1/2010 | Holt et al. | 411/107 |
| 2010/0219572 A1 | * | 9/2010 | Back | 267/221 |

FOREIGN PATENT DOCUMENTS

| | | | | |
|---|---|---|---|---|
| JP | 2005-282585 | | 10/2005 | |
| JP | 2005282585 A | * | 10/2005 | ............... F16F 9/32 |

* cited by examiner

*Primary Examiner* — Robert A Siconolfi
*Assistant Examiner* — Charles Poon
(74) *Attorney, Agent, or Firm* — Ditthavong Mori & Steiner, P.C.

(57) ABSTRACT

A spring guide is provided between a coil spring and a cylindrical outer shaft member. The coil spring coaxially houses therein a shaft portion of a damper set in which an inner shaft member is fitted in the outer shaft member slidably in an axial direction of the spring guide. The spring guide includes a barrel, at least one first projecting portion, and at least one second projecting portion. The barrel has a substantially cylindrical shape and includes a first end portion and a second end portion opposite to the first end portion in the axial direction. The at least one first projecting portion is provided at the first end portion of the barrel to project toward an axis of the barrel. The at least one second projecting portion is provided at the second end portion of the barrel to project toward the axis of the barrel.

13 Claims, 9 Drawing Sheets

BACKGROUND ART

BACKGROUND ART

SPRING GUIDE AND CUSHION DEVICE

CROSS-REFERENCE TO RELATED APPLICATIONS

The present application claims priority under 35 U.S.C. §119 to Japanese Patent Application No. 2010-038765, filed Feb. 24, 2010. The contents of this application are incorporated herein by reference in their entirety.

BACKGROUND OF THE INVENTION

1. Field of the Invention

The present invention relates to a spring guide and a cushion device.

2. Discussion of the Background

Vehicles such as motorcycles and buggies include cushion units to suspend their wheels. These cushion units have a function to appropriately buffer a vertical movement caused by the travel of the vehicle or the like. For example, in a case of a motorcycle, a rear wheel is supported rotatably by a swing arm provided vertically swingably to a vehicle body frame, and a cushion unit is placed between the swing arm and the vehicle body frame, thereby buffering the vertical movement of the rear wheel caused by travel. Thus, the drivability and ride quality are maintained at some levels.

As to the structure, the cushion unit includes a damper set in which an inner shaft member is fitted in a cylindrical outer shaft member slidably in the axial direction thereof, and a coil spring which has the dumper set housed therein coaxially and is disposed across the outer shaft member and the inner shaft member. As to the function, the vertical movement of the wheel caused by the travel of the vehicle is buffered by the coil spring and damped and absorbed by the damper set. Accordingly, the ride quality and so forth are maintained at some levels.

Here, the cushion unit buffers the vertical movement of the wheel by use of the extension and compression of the coil spring. Incidentally, the coil spring also receives vibrations of relatively high frequencies, such as vibrations caused by the travel over a road surface with small bumps and engine vibrations. This may cause the coil spring to resonate with the vibrations of the high frequencies and creates a situation where the vibrations of the vehicle body are affected, where the coil spring is rubbed against other components of the cushion unit, or where abnormal noises like chatter noises are generated by the vibrations of the coil spring itself. To solve this situation, various improvements have heretofore been proposed.

To briefly describe improvements proposed so far for the cushion unit, there is, for example, a structure using a relatively thick rubber cap to cover one end portion of the coil spring, thereby suppressing the vibrations. Moreover, improvements as illustrated in FIGS. 8 and 9 have been proposed as well.

A conventional cushion unit 65 shown in FIG. 8 is characterized by a structure in which a coil spring (64a, 64b) to be disposed across an outer shaft member 61 and an inner shaft member 62 is divided into two springs.

Specifically, in the structure shown in FIG. 8, a cylindrical spring seat 66 covering the outer shaft member 61 is provided to the outer shaft member 61 slidably in the axial direction thereof. A coil spring 64a is disposed between a flange 66a provided to the spring seat 66 and a flange 61a at the outer shaft member side. In addition, another coil spring 64b is disposed between the flange 66a and a flange 62a at the inner shaft member side. According to this structure of the cushion unit 65, the coil springs 64a and 64b, which differ from each other in resonance point, are jointed with the spring seat 66 therebetween, and thus the coil springs 64a and 64b interfere with each other. Consequently, the aforementioned resonance is suppressed.

Another conventional cushion unit 40 shown in FIG. 9 is one disclosed in Japanese Patent Application Publication No. 2005-282585. In its structure, a cylindrical spring guide 57 covering an outer shaft member 51 is provided to the outer shaft member 51 slidably in the axial direction thereof, and a coil spring 56 is disposed between a flange 59 of the spring guide 57 and a flange 52a at an inner shaft member side.

Moreover, in the structure, the cylindrical spring guide 57 having slits 58a is provided between the outer shaft member 51 of a dumper set 53 and the coil spring 56. Furthermore, the spring guide 57 is biased in a widening direction by an elastic ring 63 provided to a leading end side thereof (near the center of the cushion unit) so that the diameter of the seat would become larger. Thus, the spring guide 57 is aggressively brought into contact with the coil spring 56 that may vibrate due to the vibrations caused by travelling of the vehicle, or the like. Accordingly, the vibrations of the coil spring 56 are suppressed.

The cushion unit 40 as above only requires the spring guide 57 to be placed inward of the coil spring 56. This prevents the cushion unit from increasing in size and also allows the cushion unit 40 to be assembled without a cumbersome and complicated work.

Meanwhile, although the invention described in Japanese Patent Application Publication No. 2005-282585 improves the aforementioned conventional problems relatively well, there still remains room for improvement regarding noises produced when the spring guide 57 and components placed inward thereof hit each other. Moreover, the spring guide 57 disclosed in Japanese Patent Application Publication No. 2005-282585 exhibits its vibration suppressing performance by use of the combined structure with the elastic ring 62 attached to the seat itself as described above. The shape of the seat itself is therefore likely to be complicated. Thus, the assemblability remains as a problem to be solved.

SUMMARY OF THE INVENTION

According to one aspect of the present invention, a spring guide is provided between a coil spring and a cylindrical outer shaft member. The coil spring coaxially houses therein a shaft portion of a damper set in which an inner shaft member is fitted in the outer shaft member slidably in an axial direction of the spring guide. The spring guide includes a barrel, at least one first projecting portion, and at least one second projecting portion. The barrel has a substantially cylindrical shape and includes a first end portion and a second end portion opposite to the first end portion in the axial direction. The at least one first projecting portion is provided at the first end portion of the barrel to project toward an axis of the barrel. The at least one second projecting portion is provided at the second end portion of the barrel to project toward the axis of the barrel.

According to another aspect of the present invention, a cushion device for a vehicle includes a damper set, a coil spring, and the above-mentioned spring guide. An inner shaft member is fitted in a cylindrical outer shaft member slidably in an axial direction thereof in the damper set. The coil spring coaxially houses the damper set and is disposed across the outer shaft member and the inner shaft member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
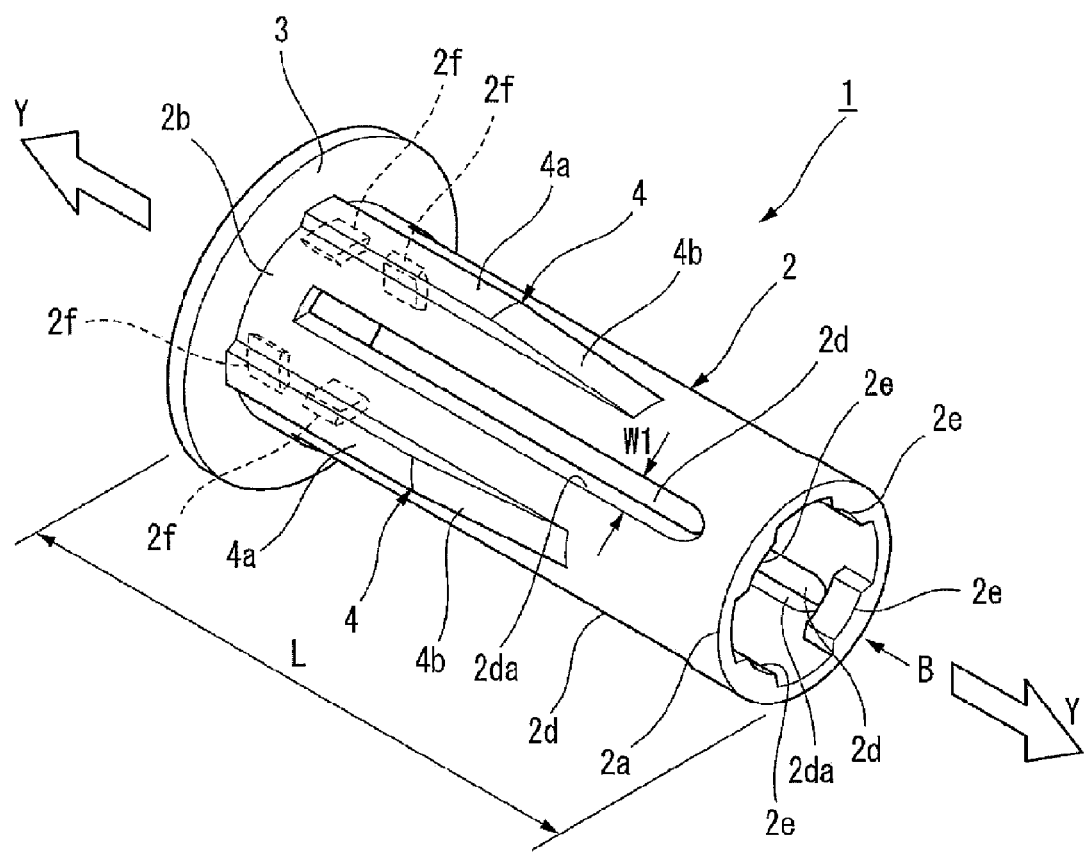
FIG. 1 is a perspective view showing a spring guide according to an embodiment of the present invention.

Hereinbelow, the embodiments of the present invention will be described with reference to the accompanying drawings, wherein like reference numerals designate corresponding or identical elements throughout the various drawings.

First, a first embodiment of the present invention will be described in detail by referring to FIGS. 1 to 7. In the embodiment, the detailed description will be given of a spring guide and a cushion unit that are applied to a motorcycle.

Note that the spring guide and the cushion unit according to the embodiment of the present invention is not limited for motorcycles, and can be applied as a spring guide and a cushion unit of various vehicles as a matter of course.

To begin with, the overall structure of the motorcycle of the embodiment will be described by referring to FIG. 7.

Figure 7:
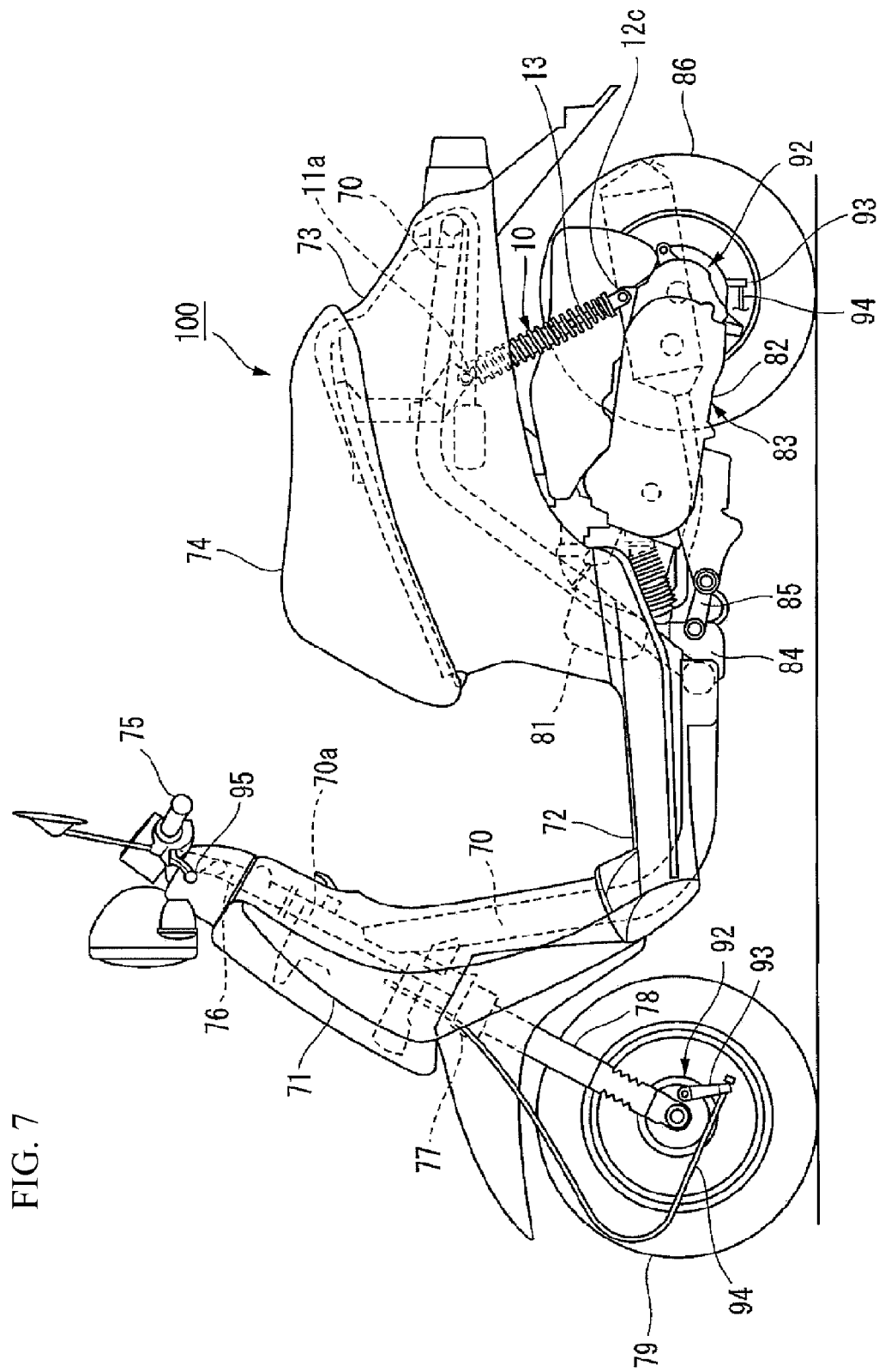
FIG. 7 is a side view showing the overall configuration of a motorcycle to which the spring guide and the cushion unit of an embodiment of the present invention is applied.
Figure 8:
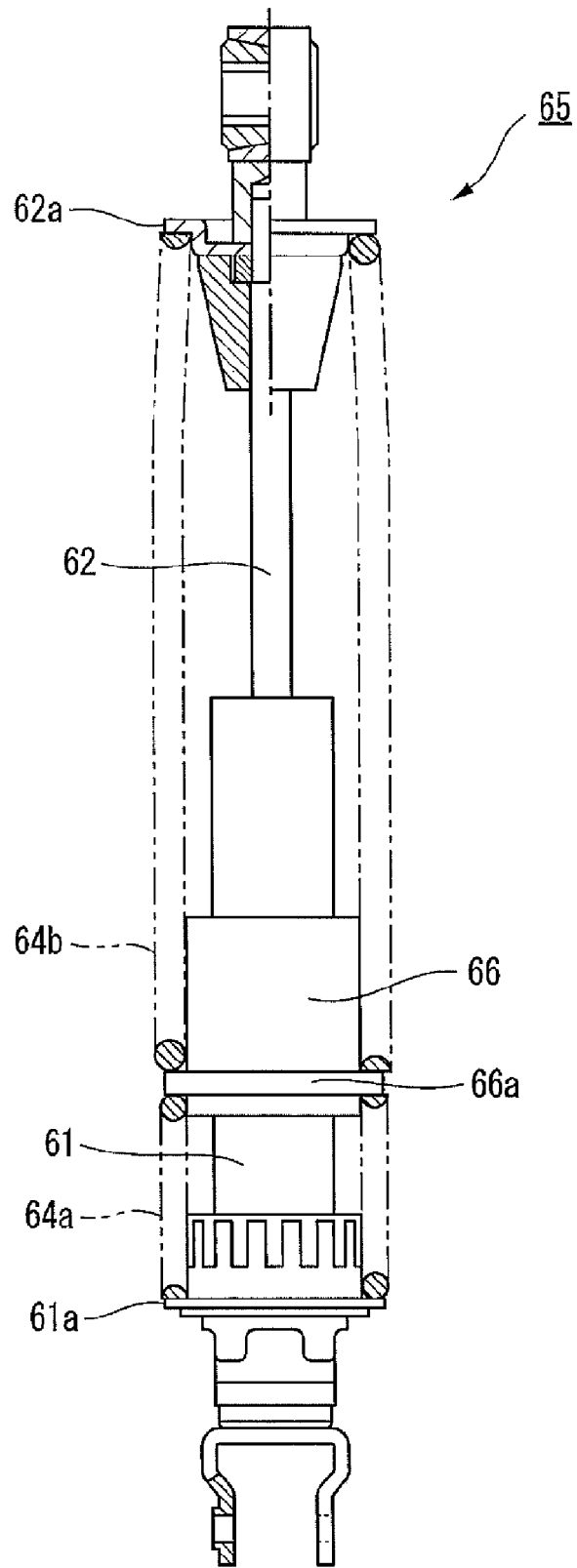
FIG. 8 is a partially-cutaway cross-sectional view of an exemplary conventional cushion unit.
Figure 9:
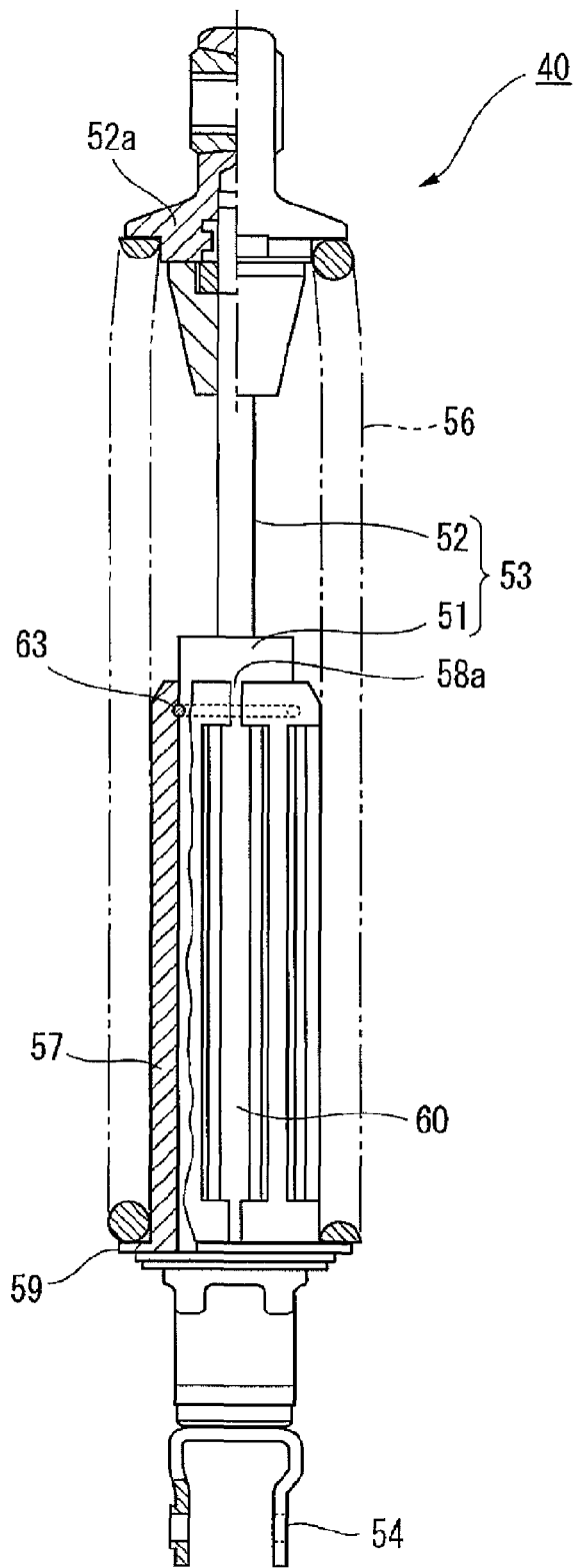
FIG. 9 is a partially cutaway cross-sectional view of another exemplary conventional cushion unit.

As shown in FIG. 7, a motorcycle 100 is of a scooter type. The motorcycle 100 has its vehicle body framework formed by a frame 70. A leg shield 71 and a low step floor 72 are provided to a front portion of the frame 70, and a rear body 73 is provided to a rear portion of the frame 70. Moreover, a seat 74 is provided on top of the rear body 73.

A steering shaft 76 having a handle bar 75 at its upper end is supported by a head pipe 70a at the front end of the frame 70 axially turnably about the head pipe 70a. A bottom bridge 77 is provided to the lower end of the steering shaft 76 by welding. Front forks 78 are provided to the bottom bridge 77 by welding or bolting. A front wheel 79 is provided to the lower ends of the front forks 78 rotatably.

An engine 81 and a belt-type continuously variable transmission 82 transmitting the engine output are integrated together to form a power unit 83. This power unit 83 is provided vertically swingably to a bracket 84 provided to the frame 70, with linkages 85 therebetween. Also, the power unit 83 is supported with a cushion unit 10 between itself and the frame 70. To a rear wheel 86 supported by the power unit 83, the engine output is transmitted through the belt-type continuously variable transmission 82 so that the rear wheel 86 is driven rotationally.

In other words, the configuration is that the cushion unit 10 to be described later buffers the vertical movement of the rear wheel 86 caused by the travel of the motorcycle 100.

Meanwhile, mechanical drum brake systems 92 are provided to the front wheel 79 and the rear wheel 86, respectively. These brake systems 92 brake the rotating wheels by causing brake wires 94 to pull brake arms 93, respectively. That is, the forces of brake operations, which are produced when the driver pulls brake levers 95 provided to the handle bar 75, are transmitted via the brake wires 94 and cause the brake arms 93 to pivot to brake the rotating wheels, respectively.

Figure 5:
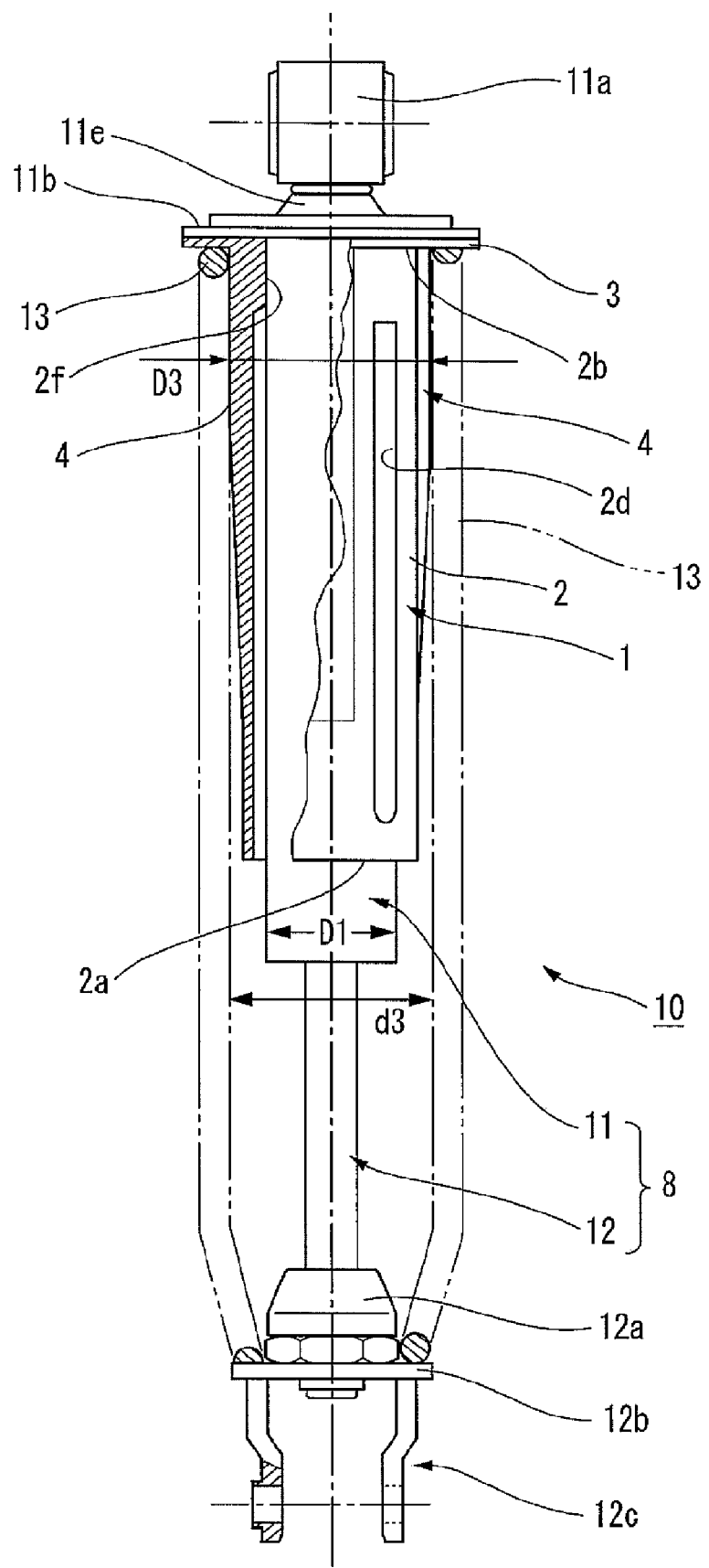
FIG. 5 is a partially-cutaway side view of a cushion unit according to the embodiment of the present invention.

In the embodiment, a spring guide 1 is shown in FIGS. 1 to 4. A cushion unit 10 is shown in FIG. 5.

Figure 6:
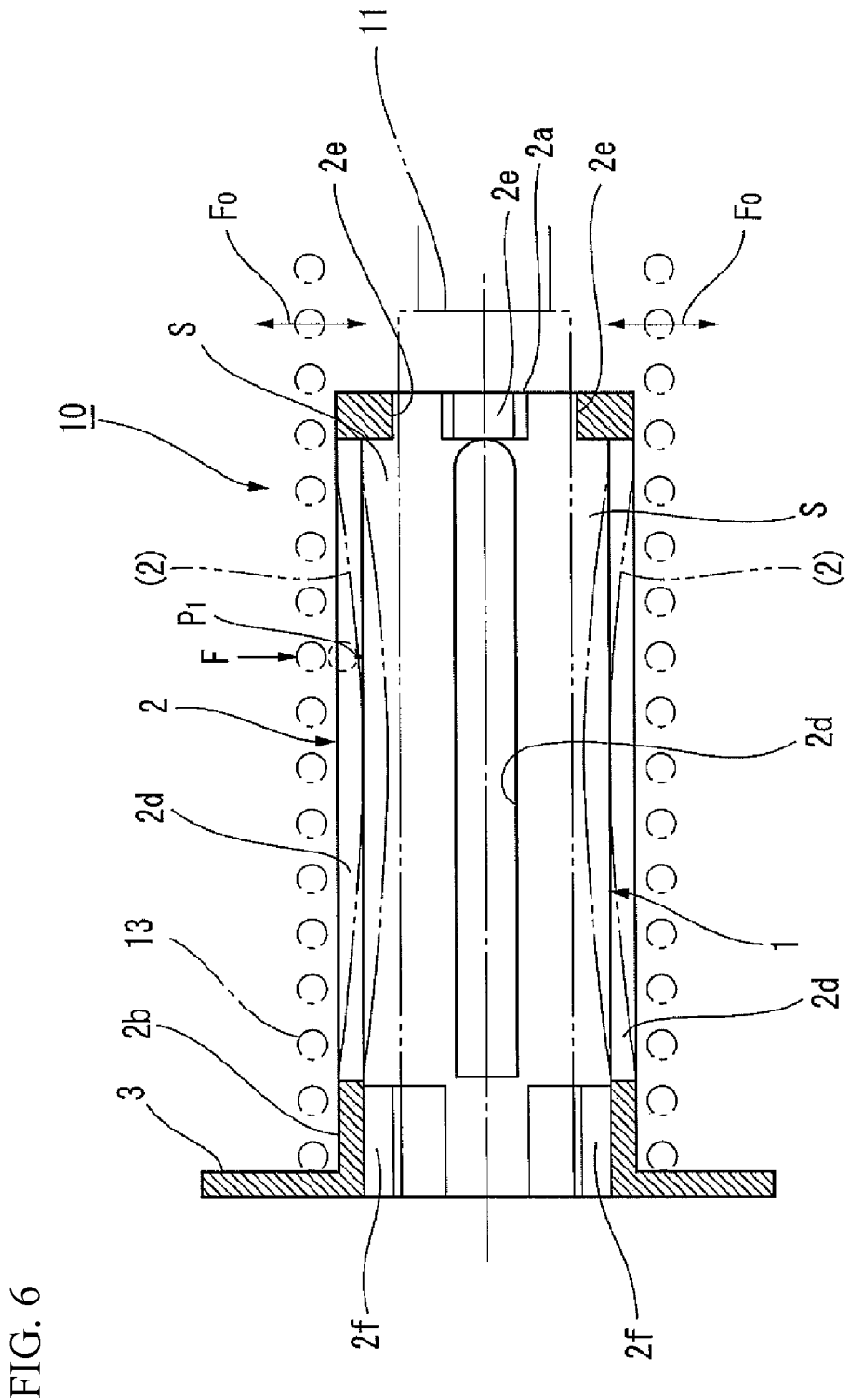
FIG. 6 is a schematic cross-sectional view of a main part for describing the operations of the spring guide and the cushion unit according to the embodiment of the present invention.

Incidentally, FIG. 6 shows a schematic cross-sectional view of a main part for describing the operation of the spring guide according to the embodiment.

The cushion unit 10 of the embodiment shown in FIG. 5 will be described.

When roughly divided, the configuration of the cushion unit 10 is divided into a damper set 8, a coil spring 13 and the spring guide 1. The damper set 8 has a structure in which an inner shaft member 12 is fitted in a cylindrical outer shaft member 11 axially slidably. As is publicly known, this damper set 8 operates to damp vibrations by causing the inner shaft member 12 to axially slide inside the outer shaft member 11 while the motorcycle 100 is travelling.

Note that in the embodiment, an attachment portion 11a at one end of the outer shaft member 11 is attached to the frame 70 and one end of the inner shaft member 12 is attached to the power unit 83 through an attachment bracket 12c. Therefore, the inner shaft member 12 is configured to slide reciprocatingly inside the outer shaft member 11 in response to the vertical movement of the rear wheel 86.

The coil spring 13 is provided with the damper set 8 housed therein coaxially. One end of the coil spring 13 presses a receiving flange 11b (upper part of FIG. 5) attached to the outer shaft member 11 whereas the other end of the coil spring 13 is supported on and is in contact with a receiving flange 12b (lower part of FIG. 5) attached to the inner shaft member 12.

Thus, the coil spring 13 is disposed across the outer shaft member 11 and the inner shaft member 12, and the vertical movement of the rear wheel 86 is buffered by the extension and compression of the coil spring 13.

The spring guide 1 in a substantially cylindrical shape as shown in FIGS. 1 to 4 is provided between the damper set 8 and the coil spring 13.

As shown in FIG. 5, the presence of the spring guide 1 avoids the direct contact between the coil spring 13 and the outer shaft member 11 of the damper set 8. One major characteristic of the spring guide 1 is that its barrel 2 is formed in a cylindrical shape in horizontal cross section. Moreover, each of cross sections of the barrel 2 of the spring guide 1 besides those at a flange portion has a circumscribed circle diameter (D3) approximately equal to or slightly smaller than the inner diameter (d3) of the coil spring 13.

Figure 2:
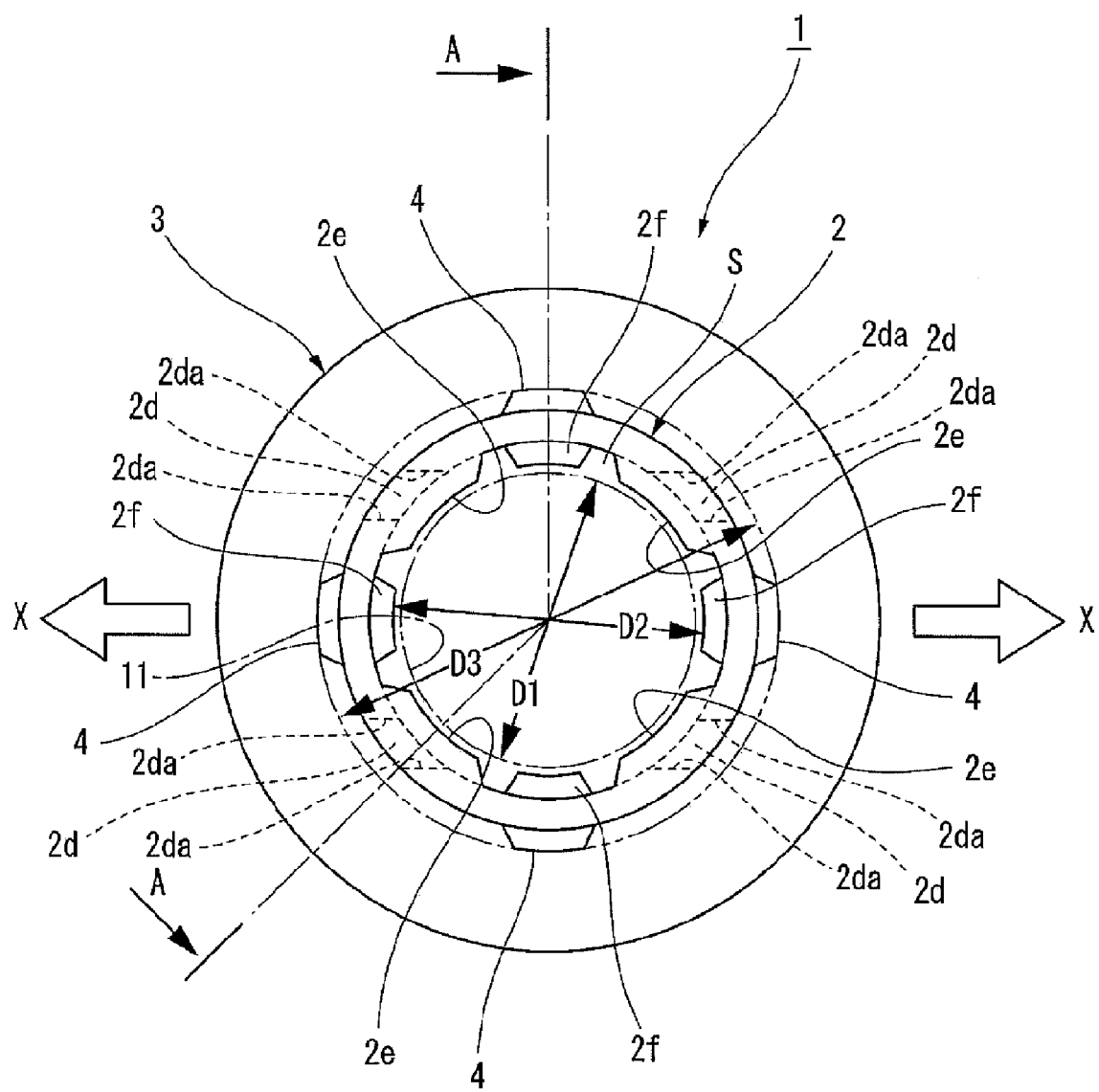
FIG. 2 is a front view of the spring guide shown in FIG. 1, which is viewed from a direction of an arrow B in FIG. 1.
Figure 3:
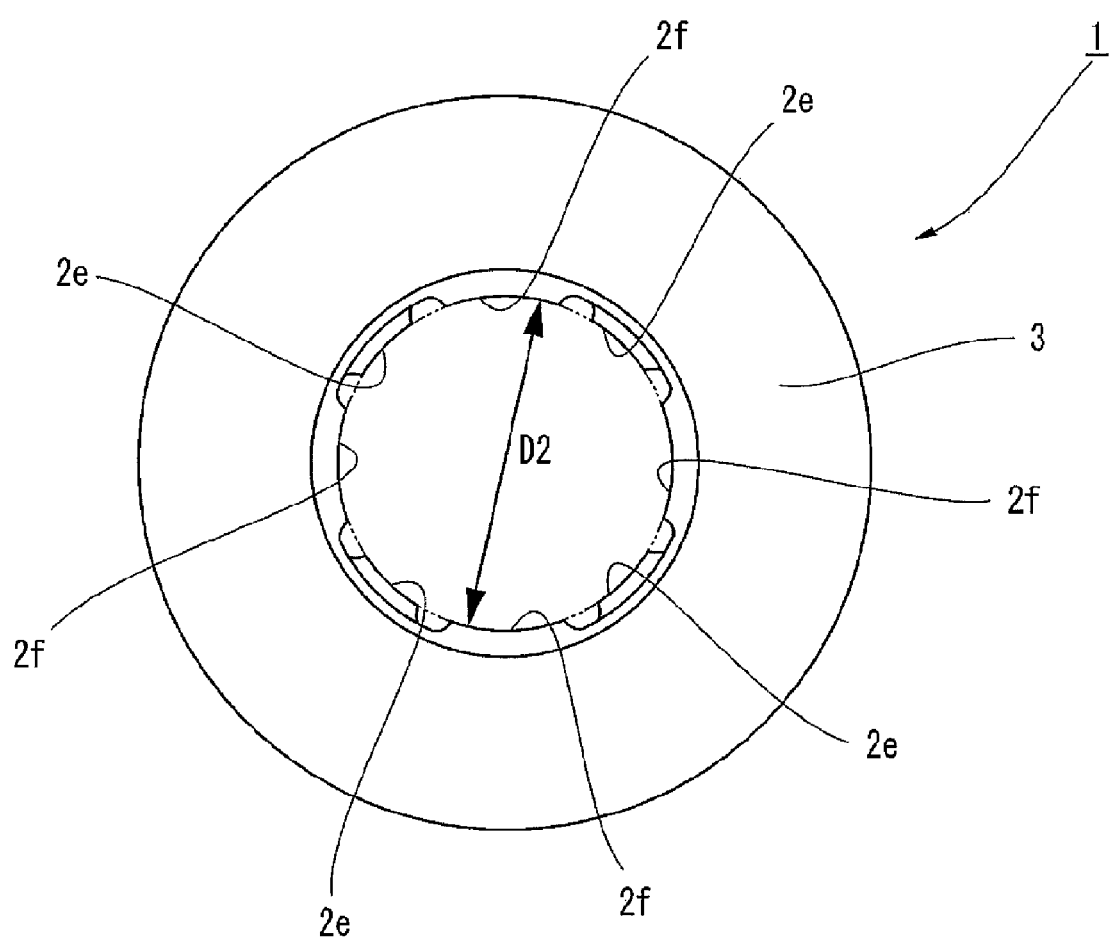
FIG. 3 is a back view of the spring guide shown in FIG. 1, which is view from a flange side (opposite side in the direction of the arrow B in FIG. 1)
Figure 4:
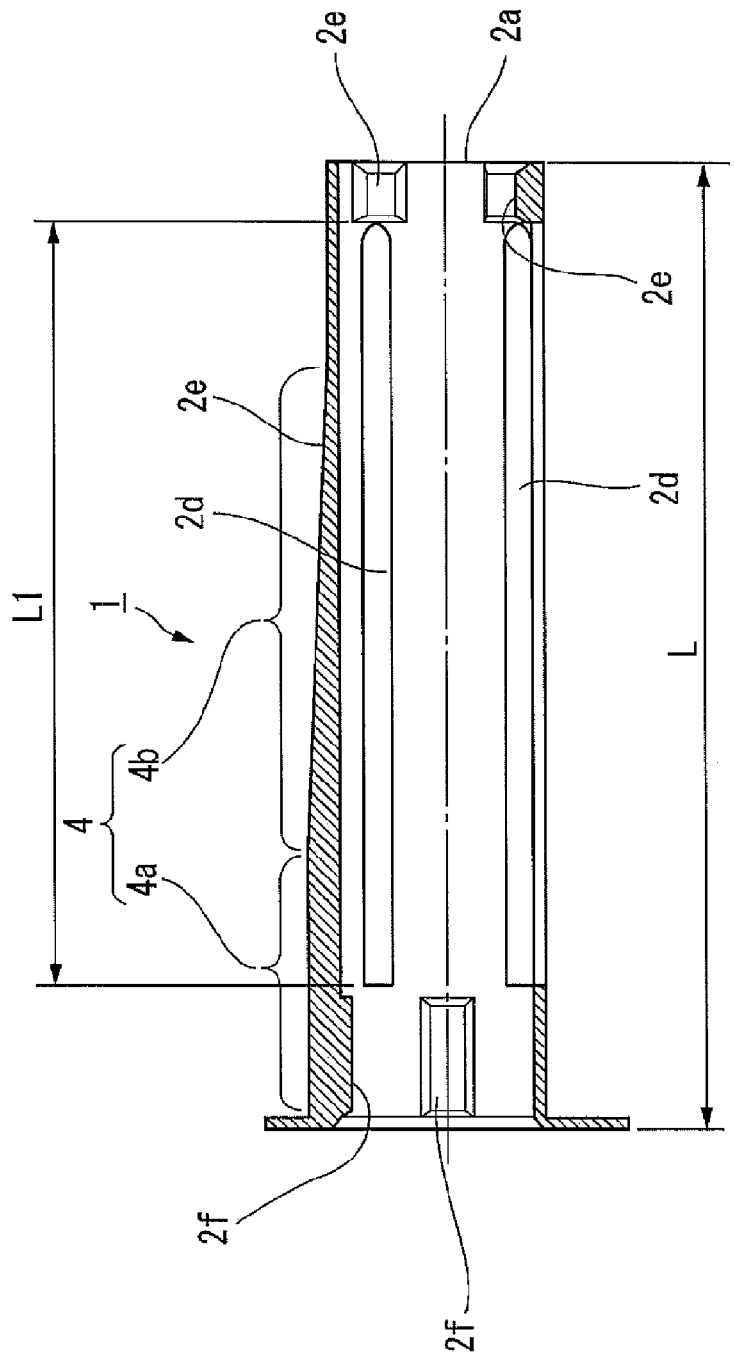
FIG. 4 is a cross-sectional view of the spring guide shown in FIG. 2, which is viewed along arrows A-A in FIG. 2.

As shown in FIGS. 1 and 2, projecting portions 2e and projecting portions 2f are formed on the inner face of the barrel 2 of the spring guide 1. Four projecting portions 2f are formed at a side near a base end 2b, which is one of the ends of the barrel 2. Four projecting portions 2e are formed at a side near a leading end 2a, which is the other end. These sets of projecting portions 2e and projecting portions 2f are provided along the circumferential direction of the barrel 2 (see FIGS. 2 and 3) at such positions as to be disposed alternately when viewed from the axial direction. Further, these positions do not overlap one another when viewed from a direction along which the axis extends (the direction shown in FIGS. 2 and 3).

The positions at which the projecting portions are formed do not overlap with one another when viewed from the axial direction of the barrel as described above. Thus, in a case of fabrication through molding, molding dies can be made simple (because there is no overlapping when viewed from die releasing directions Y (axial direction) shown in FIG. 1)

In addition, in the embodiment, each projecting portion 2e at the leading end 2a side is formed to have an axial length smaller than that of each projecting portion 2f at the base end 2b side. Thereby, increase in the rigidity at the lead end 2a side is suppressed to the extent possible.

When the spring guide 1 is installed in the cushion unit 10, the barrel 2 comes into substantial contact with the outer shaft member 11 at the projecting portions 2e and the projecting portions 2f as shown in FIG. 2. Accordingly, a space S is formed between the outer shaft member 11 and the other portions of the barrel 2 than the portions where the projecting portions 2e and 2f are formed.

Meanwhile, a flange 3 is formed at the base end 2b of the barrel 2. Also, in the barrel 2, there are formed in total four slits 2d penetrating radially from inner to outer guide surfaces. The slits 2d are situated in phase circumferentially with the projecting portions 2e at the leading end 2a side of the barrel 2 (see FIG. 2). Moreover, the slits 2d are formed adjacent to the projecting portions 2e, respectively.

Furthermore, in the embodiment, inscribed circle diameters (D2) are set equal between a portion where the projecting portions 2e at the leading end 2a side are formed and a portion where the projecting portions 2f at the base end 2b side are formed. However, the diameters are not limited to this and may slightly differ from each other.

Note that end surfaces 2da defining the slits 2d are formed as surfaces all inclined in one direction that is different from the radial direction of the barrel 2. Specifically, as shown in FIG. 2, the end surfaces 2da are formed in parallel to the directions of arrows X which are die releasing directions of molding dies (perpendicular direction to the axis. Accordingly, the moldability is improved.

In the embodiment, four ridges 4 are formed on an outer circumference of the barrel 2 along the axis thereof from the base end 2b toward the leading end 2a. Each of these ridges 4 is formed to have a base end side section 4a and an inclined section 4b. The base end side section 4a is a portion that extends from the base end 2b by about ⅓ of the length of the ridge 4 for example, and has a constant protrusion height. The inclined section 4b lies next to the base end side section 4a toward the leading end and gradually decreases in height toward the leading end 2a.

Note that in the ridge 4, the base end side section 4a having a constant height corresponds to a close coiling portion (where the coil pitch is small) of the coil spring 13, whereas the inclined section 4b corresponds to a normal coiling portion where the coil pitch is relatively large compared to the close coiling portion.

As shown in FIG. 2, the spring guide 1 of the embodiment is so formed that its inscribed circle diameters D2 in horizontal cross sections including the projecting portions (2e and 2f) are substantially the same as an outer diameter D1 of the outer shaft member 11. Meanwhile, the spring guide 1 is desirably formed to have such a length (L) that its leading end 2a is situated at a middle portion of the coil spring 13 in the longitudinal direction thereof, and that the spring guide 1 covers almost the entire length of the outer shaft member 11.

Note that the spring guide 1 is preferably made of a material with an adequate elasticity, such as rubber or resin; however, the material is not limited to these. For example, in consideration of characteristics of the vehicle as the application target and characteristics concerning the condition of use, it is possible to employ a composite of resin and rubber, a composite member obtained through the insert molding of metal or some other member into resin, or the like. In this way, the vibration characteristic thereof can be changed as appropriate.

The operations of the spring guide 1 and the cushion unit 10 in the embodiment will be described in detail by referring the FIG. 6.

Note that a schematic view shown in FIG. 6 illustrates a state assuming for example that the motorcycle 100 receives a shock or vibration F0 while travelling and a force is applied to the coil spring 13 of the cushion unit 10 in a radial direction of the cushion unit.

Here, we will consider a case where, in the cushion unit 10 shown in FIG. 6, the coil spring 13 vibrates with respect to the barrel 2 of the spring guide 1 due to the vibration F0, and acts to push the barrel 2 at a certain point (contact point P1) thereon toward the inner side of the spring guide by a pressure (F) caused by the vibration.

By the pressure (F), the barrel 2 is pushed inward at the contact point P1. As a result, the barrel 2 is brought into a contact state where some of the projecting portions 2e (at the leading end 2a side) and projecting portions 2f (at the base end 2b side) that are shown for example at an upper part of FIG. 6 press an outer surface of the outer shaft member 11.

In this event, the radial movement of the barrel 2 at its both end sides (the leading end 2a side and the base end 2b side) is limited by both projecting portions 2e and 2f. However, around a portion corresponding to the contact point P1, the space S is formed inward of the barrel 2. Thus, the barrel 2 can deform to curve inward in the radial direction of the barrel (deformation indicated by imaginary lines (2) in FIG. 6), for example.

Since the barrel 2 can bow radially as described above, it is possible to effectively absorb a shock or the like (pressure). In an actual case, the bowing action shown in FIG. 6 is repeated as vibrations. Thus, the spring guide 1 can effectively damp and absorb the external force.

Further, since the slits 2d are formed in the barrel 2 in its longitudinal direction (axial direction), the rigidity thereof is adjusted to be low. Thereby, the energy of a shock can be absorbed.

Furthermore, the set of projecting portions 2e (at the leading end 2a side) and the set projecting portions 2f (at the base end 2b side) are separated from each other in the axial direction of the barrel 2 and also situated at such positions as to appear to be disposed alternately in the circumferential direction of the barrel 2. Thus, the portion coming into contact with the outer shaft member 11 at the time of receiving the pressure (F) as described above is displaced also in the circumferential direction by a predetermined distance. Specifically, the inward bowing by the pressure (F) as shown in FIG. 6 can be actually caused in an oblique direction, which is inclined with respect to the radial direction and circumferential direction of the barrel 2. This in turn creates a state where the barrel 2 is deformed while being slightly twisted. Accordingly, the spring guide 1 can damp and absorb shocks and vibrations highly effectively in various forms.

Meanwhile, in the embodiment, the slits 2d are adjacent to the projecting portions 2e at the leading end 2a side of the barrel 2, respectively. This allows the projecting portions 2e to increase the rigidity of the leading end 2a to a lesser extent. Thus, the leading end 2a has an excellent deformability. Accordingly, the leading end 2a can be expected to bring about a vibration absorbing effect for a portion near a substantial center of the coil spring 13 where the vibration amplitude is greatest.

Note that in the embodiment, the coil spring 13 itself possesses elasticity and is a single component, and thus the spring guide 1 is readily installed between the coil spring 13 and the damper set 8. This contributes to the assemblability.

In the cushion unit 10 including the spring guide 1 configured as above, the vertical movement of the rear wheel 86 caused by the travel of the vehicle shown in FIG. 7 is buffered by the extension and compression of the coil spring 13 and effectively damped by the damper set 8.

Then, as the coil spring 13 starts vibrating upon receipt of vibrations of relatively high frequencies, such as vibrations caused by the travel of the vehicle and engine vibrations, the spring guide 1 in contact with the coil spring 13 operates as described above to suppress the vibrations of the coil spring 13.

Thus, the cushion unit 10 of the embodiment can reduce the vibrations of the coil spring 13. Thereby, it is possible to achieve a fine ride quality through the exhibition of the buffering effect attributable to the spring characteristics which the coil spring naturally has, and also to prevent the wear caused between the coil spring 13 and the other components and further the generation of abnormal noises which would otherwise be caused by the vibrations.

Hereinabove, the embodiment of the present invention is described. However, the present invention is not limited by the configuration in the embodiment, and various changes can be made. For example, although the number of projecting portions is eight in total in the above embodiment, the number as well as the shapes, sizes and even formed positions are not limited to those in the embodiment and can be set appropriately. In addition, the number and shape of slits can be set appropriately. Moreover, although the embodiment has the configuration where the positions at which the slits 2d are formed are adjacent respectively to the projecting portions 2e at the leading end 2a side of the spring guide 1, the configuration is not limited to this and may be such that the slits 2d are adjacent respectively to the projecting portions 2f at the base end 2b side.

Furthermore, the damper set may be any set as long as an inner shaft member is supported slidably on an outer shaft member, and does not have to be particularly configured to generate damping force.

In the spring guide according to the embodiment of the present invention, the structure is such that the spring guide is supported by the projecting portions given at both end portions of the barrel. Thus, certain portions of the spring guide are normally away from the outer shaft member. This allows the barrel to be displaced in a radial direction thereof by a shock or the like applied by the coil spring on the outer side. Accordingly, the energy of the collision of the coil spring is buffered, and the shock from the coil spring is effectively prevented from being transmitted directly to the outer shaft member. As a result, it is possible to significantly improve the performance to reduce abnormal noises of the coil spring as well as to absorb and suppress the vibrations of the coil spring.

In the spring guide according to the embodiment of the present invention, the projecting portions are formed to be separated from each other in the circumferential direction. Accordingly, in addition to the effects according to the embodiment, it is possible to inhibit the projecting portions from increasing the rigidity of the spring guide, and therefore to provide a spring guide whose barrel has a secured deformability in its circumferential direction.

In the spring guide according to the embodiment of the present invention, the slits are formed in phase with the projecting portions in the circumferential direction of the barrel. Accordingly, in addition to the effects according to the embodiment, it is possible to inhibit the rigidity from increasing more than necessary by the formation of the projecting portions, and therefore to provide a spring guide whose barrel has a secured deformability.

In the spring guide according to the embodiment of the present invention, the slits are adjacent to the projecting portions. Accordingly, in addition to the effects according to the embodiment, it is possible to effectively and significantly lower the rigidities of the portions where the projecting portions are formed, and therefore to provide a spring guide having a secured deformability.

In the spring guide according to the embodiment of the present invention, the rigidity is reduced in peripheral portions of the projecting portions situated near a longitudinally middle portion of the coil spring where vibrations are relatively large. Accordingly, in addition to the effects according to the embodiment, it is possible to effectively reduce contact noises generated when the coil spring comes into contact with the barrel.

In the spring guide according to the embodiment of the present invention, the projecting portions at the one side end and the other end side of the barrel are formed to appear to be disposed alternately in the circumferential direction. Accordingly, in addition to the effects according to the embodiment, it is possible to spread disproportionate rigidities in the circumferential direction of the barrel, and therefore to provide a spring guide whose barrel can be expected to bow obliquely.

In the spring guide according to the embodiment of the present invention, the effects according to the embodiment can be obtained more effectively.

The cushion unit according to the embodiment of the present invention includes the above-mentioned spring guide. Since the positions of the contact between the spring guide and the damper set are limited to the projecting portions, a space is secured between the damper set and the other portions than the portions where the projecting portions are formed. Thus, the cushion unit is provided with a space where the spring guide can deform readily, and also with the spring guide which has a large deformation capacity. Accordingly, it is possible to provide a cushion unit high in vibration absorbing performance.

Obviously, numerous modifications and variations of the present invention are possible in light of the above teachings. It is therefore to be understood that within the scope of the appended claims, the invention may be practiced otherwise than as specifically described herein.

What is claimed is:

1. A spring guide to be provided between a coil spring and a cylindrical outer shaft member, the coil spring coaxially housing therein a shaft portion of a damper set in which an inner shaft member is fitted in the outer shaft member slidably in an axial direction of the spring guide, the spring guide comprising:

a barrel having a substantially cylindrical shape and including a first end portion and a second end portion opposite to the first end portion in the axial direction;

a plurality of first projecting portions provided at the first end portion of the barrel to project toward an axis of the barrel, the plurality of first projecting portions are provided to be separated from each other in a circumferential direction of the barrel; and a plurality of second projecting portions provided at the second end portion of the barrel to project toward the axis of the barrel, the plurality of second projecting portions are provided to be separated from each other in the circumferential direction of the barrel, wherein the barrel includes a plurality of slits penetrating from an inner surface to an outer surface of the barrel in a radial direction of the barrel, and wherein the plurality of slits are formed at positions that are in phase in the circumferential direction with at least one of the plurality of first projecting portions and the plurality of second projecting portions, respectively, wherein between the first end portion and the second end portion, the plurality of first projecting portions and the plurality of second projecting portions are formed at such positions as to appear to be disposed alternately when viewed from a direction along which the axis of the barrel extends.

2. The spring guide according to claim 1, wherein the plurality of slits are formed adjacent, in a longitudinal direction of the barrel, to at least one of the plurality of first projecting portions and the plurality of second projecting portions, respectively.

3. The spring guide according to claim 1, wherein the plurality of first projecting portions provided in phase with the plurality of slits respectively are provided to the first end portion which is closer to a middle portion of the coil spring in a longitudinal direction thereof.

4. The spring guide according to claim 1, wherein the plurality of first projecting portions and the plurality of second projecting portions are formed at such positions as to appear not to overlap each other in the circumferential direction of the barrel when viewed from the direction along which the axis of the barrel extends.

5. A cushion device for a vehicle, comprising:

a damper set in which an inner shaft member is fitted in a cylindrical outer shaft member slidably in an axial direction thereof, a coil spring which coaxially houses the damper set and which is disposed across the outer shaft member and the inner shaft member, the spring guide according to claim 1.

6. The spring guide according to claim 2, wherein the plurality of first projecting portions provided in phase with the plurality of slits respectively are provided to the first end portion which is closer to a middle portion of the coil spring in a longitudinal direction thereof.

7. A cushion device for a vehicle, comprising:

a damper set in which an inner shaft member is fitted in a cylindrical outer shaft member slidably in an axial direction thereof, a coil spring which coaxially houses the damper set and which is disposed across the outer shaft member and the inner shaft member, the spring guide according to claim 2.

8. The spring guide according to claim 1, further comprising:

a plurality of ridges provided on an outer surface of the barrel and that project away from the axis of the barrel, the plurality of ridges longitudinally extending in a longitudinal direction of the barrel.

9. The spring guide according to claim 8, wherein the plurality of ridges are provided to be separated from each other in the circumferential direction of the barrel at locations in between the plurality of slits.

10. The spring guide according to claim 1, wherein the plurality of slits are adjacent to and aligned with the plurality of first projecting portions in a longitudinal direction of the barrel.

11. The spring guide according to claim 10, wherein the plurality of slits are not aligned with the plurality of second projecting portions in the longitudinal direction of the barrel.

12. The spring guide according to claim 11, further comprising:

a plurality of ridges provided on an outer surface of the barrel and that project away from the axis of the barrel, the plurality of ridges longitudinally extending in the longitudinal direction of the barrel, and wherein the plurality of ridges are aligned with the plurality of second projecting portion in a radial direction of the barrel.

13. The spring guide according to claim 1, wherein the plurality of first projecting portions abut a first end surface of the first end portion of the barrel, and wherein the plurality of second projecting portions abut a second end surface of the second end portion of the barrel.

\* \* \* \* \*